(12) United States Patent
Kwon et al.

(10) Patent No.: US 9,025,579 B2
(45) Date of Patent: May 5, 2015

(54) WIRELESS CONNECTION MANAGEMENT PROCEDURE

(75) Inventors: Young Hoon Kwon, San Diego, CA (US); Zhigang Rong, San Diego, CA (US); Limei Wang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 650 days.

(21) Appl. No.: 13/277,388

(22) Filed: Oct. 20, 2011

(65) Prior Publication Data
US 2013/0100944 A1    Apr. 25, 2013

(51) Int. Cl.
| | | |
|---|---|---|
| H04W 4/00 | (2009.01) | |
| H04W 52/02 | (2009.01) | |
| H04B 5/00 | (2006.01) | |
| H04W 76/02 | (2009.01) | |

(52) U.S. Cl.
CPC ........... *H04W 52/028* (2013.01); *H04B 5/0031* (2013.01); *H04W 76/026* (2013.01)

(58) Field of Classification Search
CPC .................................................. H04W 52/028
USPC .................................................. 370/338, 252
See application file for complete search history.

(56) References Cited

U.S. PATENT DOCUMENTS

2012/0140651 A1* 6/2012 Nicoara et al. ................ 370/252

OTHER PUBLICATIONS

"Smart Wi-Fi Overview—Smart Wi-Fi for Coverage & Offload," Kineto Wireless, http://www.kineto.com/solutions_smart_wifi.php, downloaded Sep. 27, 2011, 7 pages.
"Locale for Android," http://www.twofortyfouramcom/product.html, downloaded Aug. 12, 2011, 4 pages.
"WiFiHero on Crackberry App Superstore," http://www.mobihand.com/150/product.asp?id-40358, downloaded Aug. 12, 2011, 5 pages.

* cited by examiner

*Primary Examiner* — Dang Ton
*Assistant Examiner* — Kevin Lee
(74) *Attorney, Agent, or Firm* — Conley Rose, P.C.; Grant Rodolph; William H. Dietrich

(57) ABSTRACT

An apparatus comprising a connection manager in a user equipment (UE) configured to communicate with a cellular network via a cellular interface and with a short range wireless access network via a short range wireless access interface, wherein the connection manager is configured to enable the short range wireless access interface when a data connection request is detected and disable the short range wireless access interface when no more data connection requests are detected after expiration of a pre-determined time, and wherein the data connection request is at least partially delivered via the cellular interface while the short range wireless access interface is being set up and data connection is switched to the short range wireless access interface after completing short range wireless access interface setup.

6 Claims, 5 Drawing Sheets

WIRELESS CONNECTION MANAGEMENT PROCEDURE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A cellular network is a radio network distributed over land areas referred to as cells. Each cell can be served by at least one fixed-location transceiver referred to as a cell site or base station. When joined together, the cells provide radio coverage over a wide geographic area, such as a city or larger area. This enables a large number of portable transceivers (e.g., mobile telephones, pagers, etc.) to communicate with each other and with fixed transceivers and telephones anywhere in the network, via base stations. The portable transceivers may also communicate when the transceivers are moving through more than one cell during transmission.

Another shorter range wireless communication technology is defined under the Wireless Fidelity (WiFi) standard. WiFi is a branded standard for wirelessly connecting electronic devices. A WiFi device, such as a personal computer, video game console, smartphone, or digital audio player can connect to the Internet via a WiFi network access point. A WiFi access point (or hotspot) has a range of about 20 meters (or about 65 feet) indoors and possibly a greater range outdoors. Multiple overlapping access points can cover large areas. The WiFi Alliance identifies a range of connectivity technologies for WiFi based on the Institute of Electrical and Electronics Engineers (IEEE) 802.11 standards, including wireless local area network (WLAN) connections, device to device connectivity (such as WiFi Peer to Peer or WiFi Direct), Personal area network (PAN), local area network (LAN), and even some limited wide area network (WAN) connections. Some portable devices, such as some smartphones and tablet personal computers (PCs), comprise transceivers (radios) for both cellular and WiFi communications, e.g., to provide both voice and data services.

SUMMARY

In one embodiment, the disclosure includes an apparatus comprising a connection manager in a user equipment (UE) configured to communicate with a cellular network via a cellular interface and with a short range wireless access network via a short range wireless access interface, wherein the connection manager is configured to enable the short range wireless access interface when a data connection request is detected and disable the short range wireless access interface when no more data connection requests are detected after expiration of a pre-determined time, and wherein the data connection request is at least partially delivered via the cellular interface while the short range wireless access interface is being set up and data connection is switched to the short range wireless access interface after completing short range wireless access interface setup.

In another embodiment, the disclosure includes a networking component comprising a first transceiver configured to communicate with a cellular network via a cellular interface, a second transceiver configured to communicate with a WiFi network via a WiFi interface, and a connection manager configured to enable the WiFi interface when a data connection request is detected and disable the WiFi interface when no more data connection requests are detected, at least partially deliver the data connection request via the cellular interface while the WiFi interface is being set up, and switch data connection to the WiFi interface after completing WiFi interface setup.

In yet another embodiment, the disclosure includes a wireless communications system implemented method comprising activating, with a processor, a relatively short range wireless access interface when a data connection request is detected, associating, with a processor, the relatively short range wireless access interface with the data connection request, deactivating, with a processor, the relatively short range wireless access interface if no data connection requests are detected within a determined time period, at least partially delivering the data connection request via an active relatively long range wireless access interface while the relatively short range wireless access interface is being set up, and switching data connection to the relatively short range wireless access interface after completing the relatively short range wireless access interface setup.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
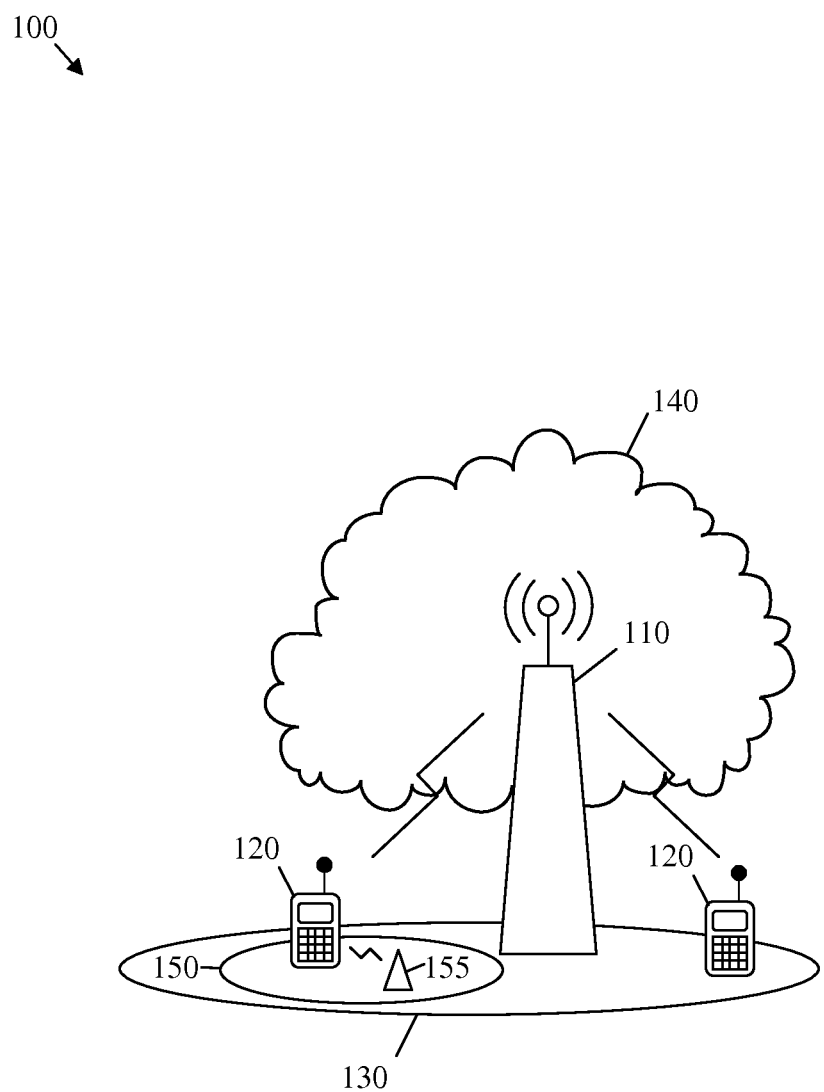
FIG. 1 is a schematic diagram of an embodiment of a radio access network.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Currently, there is a substantial increase in data traffic that sometimes results in cellular network overload. The launch of improved smartphones, such as the IPhone, may have further increased data usage on cellular networks. Telecommunication operators are considering various schemes to overcome the issue of cellular network overload due to increased data usage, such as using traffic management, network upgrade and deployment of advanced radio technologies, micro/pico/femto cell deployment, and offload to WiFi networks. (WiFi is a mechanism for wirelessly connecting electronic devices. "Wi-Fi" is a trademark of the Wi-Fi Alliance and the brand name for products using the Institute of Electrical and Electronics Engineers (IEEE) 802.11 family of standards, which are incorporated herein by reference as if reproduced in their entirety.) WiFi offload uses WiFi connectivity instead of cellular connectivity to offload at least some of the data services. WiFi offload may be one of the more cost efficient and suitable schemes, since many WiFi networks may be currently deployed. Bandwidth demanding services may take place indoor, e.g., at home, office, or classroom, where WiFi networks may be set up. Operators are also deploying their own WiFi networks, which may be accessed indoor or outside, and more smartphones and tablet PCs are being developed with WiFi capability. Such smartphones may also support auto-authentication at operators WiFi hotspots.

The goals of WiFi offload may comprise using a WiFi network when a user is under WiFi coverage, authenticating with WiFi network automatically without user's additional action, maintaining ongoing data session and/or voice call, maintaining operator's controllability on service/connection under WiFi network, or combinations thereof. However, there may be some issues or difficulties for providing widespread WiFi offload. For example, many users may turn off the WiFi radio or connectivity (in their smartphones) to reduce battery consumption and charging frequency. The users may turn on WiFi capability when they are under WiFi coverage with good signal strength. Users subscribed to unlimited data service plans, may not care about saving data usage by switching from cellular to WiFi connectivity, unless WiFi may provide better service, e.g., faster download speed, high definition video, or other improved connectivity features. If the WiFi function is manually turned off by the user, WiFi offload may not be achieved and hence cellular network overload prevention (or reduction) may not be achieved.

Disclosed herein is a system and methods for connection management of wireless communications devices, such as portable or mobile devices, that may use cellular and WiFi networks. The system and methods may allow the management of WiFi interface and switch connection to WiFi interface to enable WiFi offload and reduce device power consumption. The wireless device's WiFi interface may be enabled when a data connection request is detected. Subsequently, during the WiFi interface's set up period, on-going data connection requests may still be delivered via the device's active cellular interface. After setting up the WiFi interface, WiFi connectivity may be used instead of the cellular connection for data delivery. If there are no more data connection requests, then the WiFi interface may be disabled to save power consumption. Such WiFi interface and connection management may also reduce cellular network traffic overload and reduce WiFi connection setup delay.

FIG. 1 illustrates an embodiment of a radio access network (RAN) 100, which may comprise a long-term evolution (LTE) or LTE-Advanced (LTE-A) system, as described in the Third Generation Partnership Project (3GPP), or other existing or after developed networks. In this example, a LTE or LTE-A system may include an Evolved Universal Terrestrial Radio Access Network (E-UTRAN) node B (or eNB), a wireless access point, or a similar component rather than a traditional base station. FIG. 1 is an example and may have other components or arrangements in other embodiments. In an embodiment, the RAN 100 may comprise at least one access device 110 and at least one UE 120, both of which may be located within a cell 130. The RAN 100 may also comprise or may be coupled to a network 140.

The access device 110 may be any component of the wireless network, such as a traditional base station, a wireless access point, or an LTE or LTE-A node B or eNB, that creates a geographical area of reception and transmission coverage allowing a UE 120 or a relay node (not shown) to access or communicate with other components in a telecommunications system, such as a second UE 120. The terms "access node" and "access device" may be used herein interchangeably, but it is understood that an access node may comprise a plurality of hardware and software components.

The access device 110 may communicate with any UE 120 within the same cell 130, directly via a direct link, such as in a UTRAN. The cell 130 may be a geographical area of reception and transmission coverage. For instance, the direct link may be a point-to-point link established between the access device 110 and the UE 120 and used to transmit and receive signals between the two. Alternatively, the access devices 110 may communicate with any UE 120 in the same cell 130 over shared links, such as in an E-UTRAN. For instance, the shared links may comprise an uplink shared channel and a downlink shared channel. Additionally, the access device(s) 110 may communicate with other components or devices to provide for the components of the RAN 100 access to any other network 140, for instance using similar or different network protocols or technologies. In an embodiment, the UEs 120 may move about between different cells 130 and their communications may be handed-over between the different cells 130, where the UEs 120 may communicate with different access devices 110.

The UE 120 may be any device, apparatus, or component configured to communicate with the access device 110 and the network 140. For instance, the UE 120 may be a mobile device, such as a mobile telephone, personal digital assistant (PDA), handheld device, laptop computer, tablet computer, and similar devices that have wireless telecommunications capabilities. Specifically, the UE 120 may have multiple transceivers or radios that can use different wireless technology connections or interfaces. For example, the UE 120 may be configured to communicate with a cellular network and a WiFi network, e.g., using two separate radios (transceivers). The access device 110 may also allow the UEs 120 to communicate with a network 140. The network 140 may comprise a wireless network, a wired network, or a combination of any wired or wireless networks. The networks may include any combination of a WLAN network, an Ethernet based network, an Internet Protocol (IP) based network, a Digital Subscriber Line (DSL) network, an Optical communications network, or any other wireless or wired networks that may be used to exchange communications/data with the UE 120.

In an embodiment, the UE 120 may comprise a first transceiver configured to establish a cellular link with the access device 110 in the cell 130. The UE 120 may also comprise a second transceiver configured to establish a WiFi connection with a WiFi hotspot (not shown) within a WiFi connection range. The first transceiver may be activated to obtain a voice service, a data service, or both, using the cellular link or interface. Alternatively, the second transceiver may be activated to obtain a voice service, a data service, or both, using the WiFi link or interface. In yet another scenario, both the first transceiver and the second transceiver may be activated to obtain a voice service and a data service using the cellular interface and the WiFi interface, respectively.

In an embodiment, the UE 120 may be configured to turn on the WiFi interface to enable WiFi offload on the UE 120 when the WiFi interface is required. In WiFi offload, the WiFi interface may be enabled and then used to communicate data instead of the active cellular interface to reduce cellular network overload. Specifically, the WiFi interface may be enabled when there is a data connection request, e.g., from the user or the network. During the WiFi interface set up, any on-going data connection request may be delivered via the active cellular interface. Upon completing the set up of the WiFi interface, the WiFi link may be used for data delivery. Subsequently, if there are no more data connection requests, then the WiFi interface may be disabled, e.g., after a determined wait time. Using this WiFi offload scheme, the WiFi function may not be turned on unless a data connection request is detected. The WiFi function may then be turned off when no more data requests are detected. This may minimize or reduce the power consumption due to WiFi interface usage. The WiFi offload scheme may also improve user experience, since the user may not experience the initial WiFi set up delay.

Typically, the WiFi interface may be disabled and the UE 120 may communicate via the active cellular interface, e.g., for voice calling. The WiFi interface and functions may be enabled by the UE 120 or a connection manager on the UE 120 when a data connection is requested. The connection manager may comprise one or more hardware components (e.g., processor) in the UE 120, and may be implemented using software that runs on the UE 120, or may be implemented using a combination of both hardware and software. The data connection may be requested by the user or an application that may be running on the UE 120, e.g., via an uplink (UL) from the UE 120 to the access device 110. For example, the user may activate an application on the UE 120, which may then send a data connection request on the UL. Alternatively, the data connection may be requested by a network (e.g., the network 140) on a downlink (DL) from the access device 110 to the UE 120. The network requesting connection may be a WiFi network. The data request may be for a data based application software. In some scenarios, voice calling may be requested (e.g., by the user) using a data connection (e.g., using a WiFi connection instead of a cellular connection). Thus, the connection manager (or UE 120) may initiate turning on the WiFi interface and treat the voice call request as a data request.

During the WiFi connection or interface setup, the requested data connection may be delivered using the active cellular interface. Subsequently, after completing the WiFi connection setup, the requested data connection and any further data requests made may be serviced using the active WiFi interface. If there are no more data connection requests, for instance, after a determined delay time using a timer, then the WiFi interface may enter a Sleep mode, e.g., where the WiFi interface may not be active but may still be turned on. During the Sleep mode time, which may also be determined using a timer, if no data connection requests are made (by the same application or the WiFi network), then the UE 120 or connection manager on the UE 120 may scan other WiFi networks that may be active on the UE 120 for any requested data connections. If no data connection requests are detected for the WiFi networks, then the WiFi interface may be disabled (turned off) to save power consumption.

Figure 2:
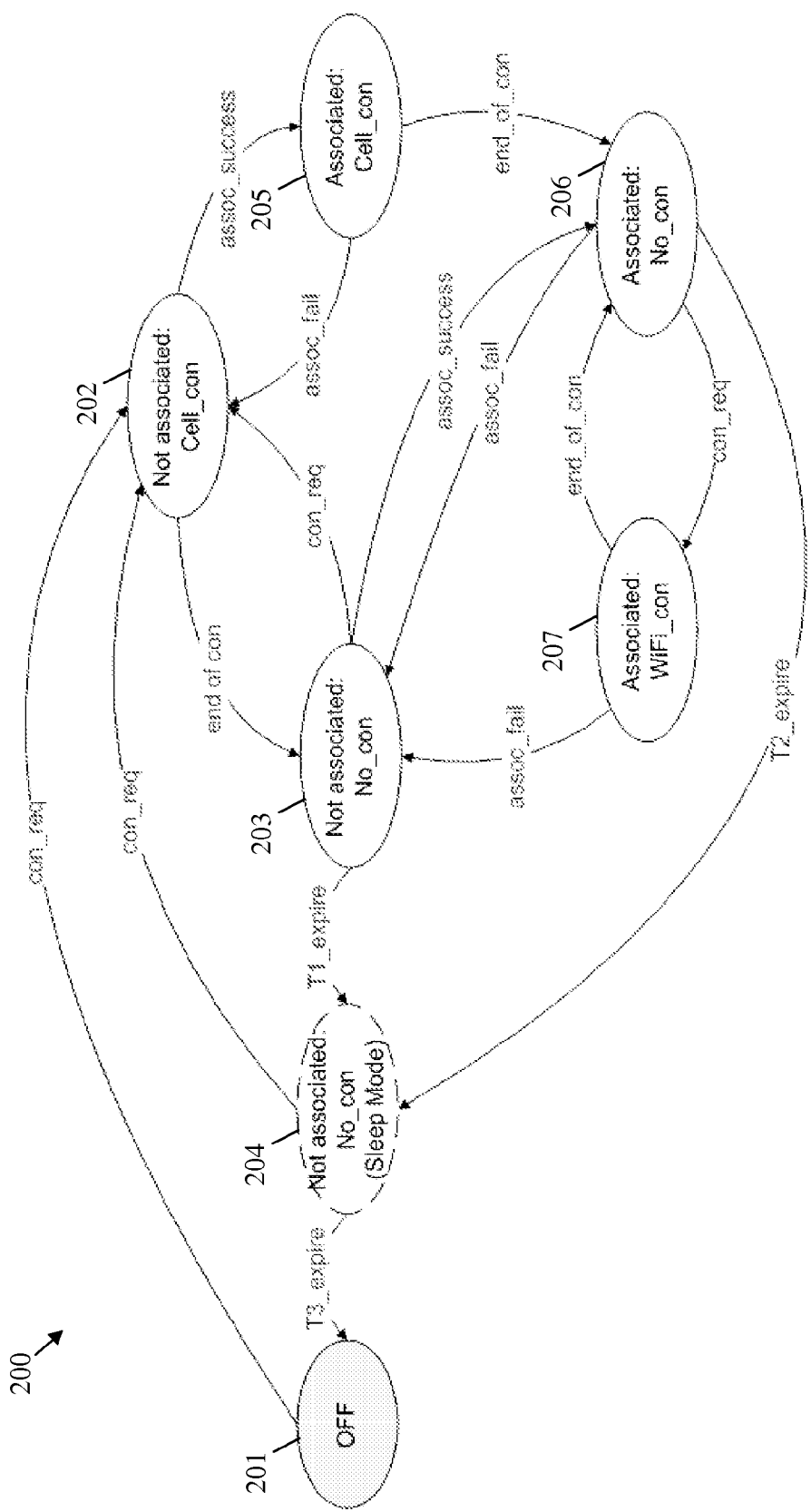
FIG. 2 is a schematic diagram of an embodiment of an internal state transition.

FIG. 2 illustrates an embodiment of an internal state transition 200 that supports the WiFi offload scheme above. The internal state transition 200 may be used to transition or switch the WiFi interface, e.g., in the UE 120, between a plurality of different operation states or modes. The WiFi interface and the connectivity of the WiFi interface may be managed by a connection manager (e.g., running on the UE 120), which may be configured to decide which interface to use for delivering the data connection. In each state, the connection manager may choose either the cellular or WiFi interface for data delivery. The states may comprise an "OFF" state 201, a "Not Associated: Cell_con" state 202, a "Not Associated: No_con" state 203, a "Not Associated: No_con (Sleep mode)" state 204, an "Associated: Cell_con" state 205, an "Associated: No_con" state 206, and an "Associated: WiFi_con" state 207, which are described in detail below.

At the "OFF" state 201, the WiFi interface may be turned off. If there is a connection request (con_req) detected (by the connection manager), the WiFi interface may be turned on and the WiFi interface may transition to the "Not Associated: Cell_con" state 202. At the "OFF" state 201, the connection manager may use the cellular interface to deliver the requested data connection. At the "Not Associated: Cell_con" state 202, the connection manager or the WiFi interface may scan for available WiFi network. In case an available WiFi network is detected, the WiFi interface may begin an authentication and association process. In the mean time, the requested data connection may be delivered via the cellular network. During the "Not Associated: Cell_con" state 202, if the requested data connection is delivered via the cellular interface (end_of con), then the WiFi interface may transition to the "Not associated: No_con" state 203. If an association to an available WiFi network succeeds (assoc_success), then the WiFi interface may transit to the "Associated: Cell_con" state 205. At the "Not Associated: Cell_con" state 202, the connection manager may use the cellular interface to deliver the requested data connection.

At the "Not Associated: No_con" state 203, a corresponding timer (T1) may be reset when entering this state, and the connection manager or the WiFi interface may scan for available WiFi networks requesting network connection. In case there is an available WiFi network detected, the WiFi interface may begin the authentication and association process. If there is a connection request (con_req) detected, the WiFi interface may transition to the "Not Associated: Cell_con" state 202 and the connection request may be delivered via the cellular interface. If an association to an available WiFi network succeeds (assoc_success), then the WiFi interface may transition to the "Associated: No_con" state 206. If no available WiFi network is found and there is no connection request until the timer T1 expires, then the WiFi interface may transition to the "Not Associated: No_con (Sleep Mode)" state 204. At the "Not Associated: No_con" state 203, the connection manager may use the cellular interface to deliver the data connection request.

At the "Not Associated: No_con (Sleep mode)" state 204, a corresponding timer (T3) may be reset when entering this state, and the connection manager or the WiFi interface may not scan for available WiFi network. Instead, the WiFi transceiver may enter a Sleep mode. If there is a connection request (con_req) detected, the connection manager or the WiFi interface may be awakened (exit the sleep mode), and the WiFi interface may transition to the "Not Associated: Cell_con" state 202. If there is no connection request detected until the timer T3 expires, then the WiFi interface may transition to the "OFF" state 201 and the WiFi interface may be disabled. At the "Not Associated: No_con (Sleep mode)" state 204, the connection manager may use the cellular interface to deliver the data connection request.

At the "Associated: Cell_con" state 205, the currently ongoing data connection may still be delivered via the cellular connection, even if an available WiFi network is detected and associated with the WiFi network. Typical WiFi operations, such as scanning, 802.11 power save mode and WiFi handover operation, may occur in this state. If the current ongoing connection is delivered via the cellular interface (end_of con), then the WiFi interface may transition to the "Associated: No_con" state 206. If a current association with the WiFi network is not maintained and/or may not be replaced by an association with another WiFi network (assoc_fail), the WiFi interface may transition to the "Not Associated: Cell_con" state 202. At the "Associated: Cell_con" state 205, the connection manager may use the cellular interface to deliver the data connection request.

At the "Associated: No_con" state 206, a corresponding timer (T2) may be reset when entering this state. Typical WiFi operations, such as scanning, 802.11 power save mode and WiFi handover operation, may occur in this state. At this state, the WiFi interface may be ready to deliver a data connection. If there is a connection request (con_req) detected, then the WiFi interface may transition to the "Associated: WiFi_con" state 207 and may then deliver the connection via the WiFi interface. If a current association with the WiFi network is not maintained and/or may not be replaced by an association with another WiFi network (assoc_fail), then the WiFi interface may transition to the "Not Associated: No_con" state 203. If there is no connection request detected until the timer T2 expires, then the WiFi interface may transition to the "Not Associated: No_con (Sleep mode)" state 204. At the "Associated: No_con" state 206, the connection manager may use the WiFi interface to deliver the data connection request.

At the "Associated: WiFi_con" state 207, the requested data connection may be delivered via the WiFi interface. Typical WiFi operations, such as scanning, 802.11 power save mode and WiFi handover operation, may occur in this state. If a current association with a WiFi network is not maintained and/or may not be replaced by an association with another WiFi network (assoc_fail), then the WiFi interface may transition to the "Not Associated: No_con" state 203. If a current data connection is delivered (end_of con), then the WiFi interface may transition to the "Associated: No_con" state 206. At the "Associated: WiFi_con" state 207, the connection manager may use the WiFi interface to deliver the data connection request.

Figure 3:
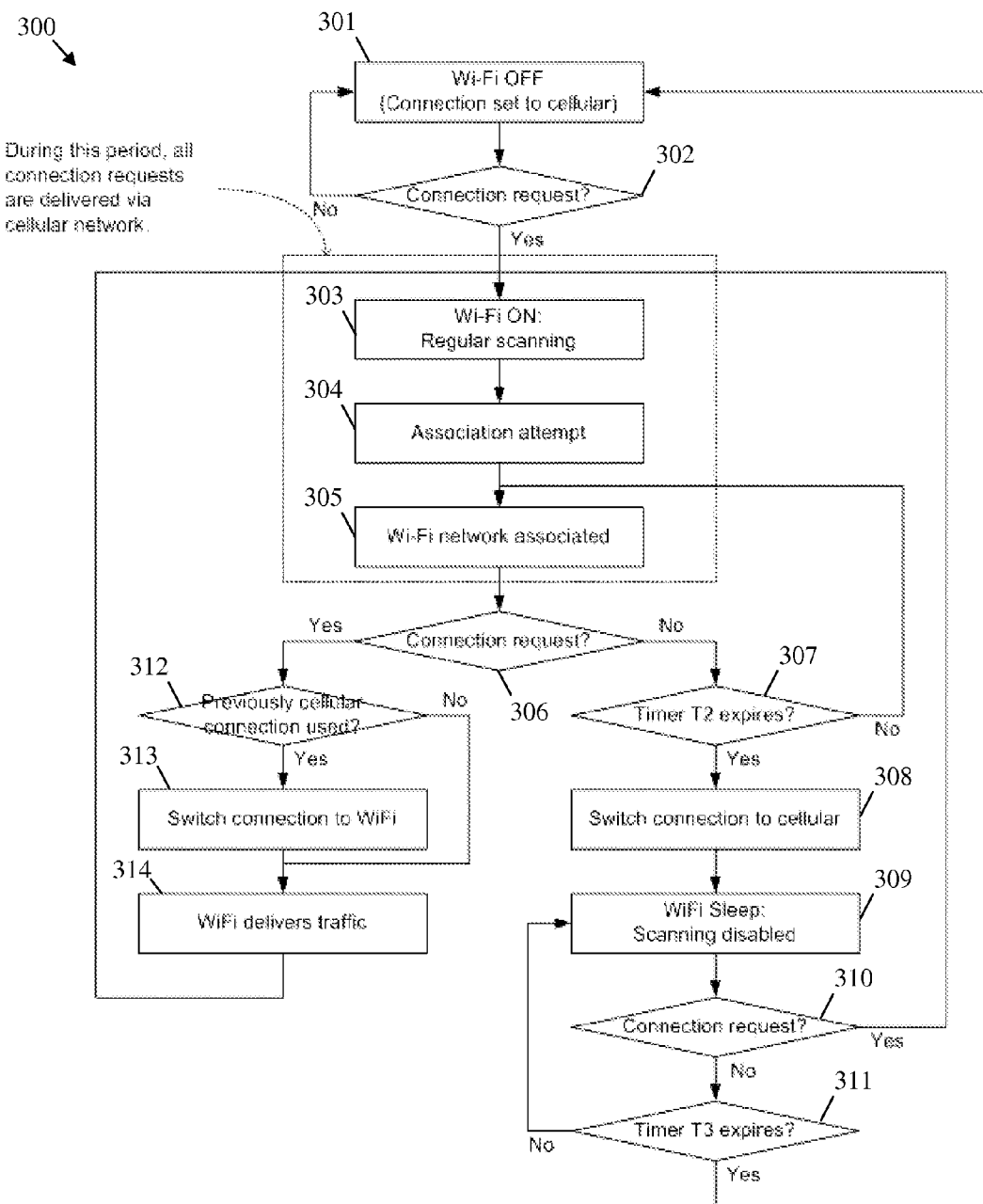
FIG. 3 is a schematic diagram of an embodiment of a data connection method under WiFi coverage.

FIG. 3 illustrates an embodiment of a data connection method 300 under WiFi coverage. The data connection method 300 may be implemented on a wireless communications device (e.g., the UE 120) when the device is within the signal coverage range of a WiFi hotspot. The method 300 may be implemented by the device or a connection manager on the device. The method 300 may begin at block 301, where the WiFi interface may be OFF and the device may have an active cellular connection. At block 302, the method 300 may determine whether a connection request is made, e.g., from an application on the phone or from the network. If a connection request is detected, then the method 300 may proceed to block 303. Otherwise, the method 300 may return to block 301.

At block 303, the WiFi interface may be turned ON and the interface may start scanning available WiFi networks. At block 304, an association attempt may be made with the network via the WiFi interface. Establishing the association may comprise authorization and authentication procedures. At block 305, the WiFi network association may be completed. During the steps at blocks 303, 304, and 305, any connection request may be delivered via the cellular network. At block 306, the method 300 may determine whether a connection request is made, e.g., from an application on the phone or from the network. If a connection request is detected, then the method 300 may proceed to block 312. Otherwise, the method 300 may proceed to block 307.

At block 307, the method 300 may determine whether a timer (e.g., T2) expired. If the timer is expired, then the method 300 may proceed to block 308. Otherwise, the method 300 may return to block 305. At block 308, a switch to the cellular interface (from the WiFi interface) may be made, e.g., to deliver and service future connection requests. At block 309, the WiFi interface may enter the Sleep mode and the scanning of WiFi networks may be disabled. At block 310, the method 300 may determine whether a connection request is made, e.g., from an application on the phone or from the network. If a connection request is detected, then the method 300 may return to block 303. Otherwise, the method 300 may proceed to block 311. At block 311, the method 300 may determine whether a timer (e.g., T3) expired. If the timer is expired, then the method 300 may return to block 301. Otherwise, the method 300 may return to block 309.

At block 312, the method 300 may determine whether a previously active cellular connection is used. If a previously established cellular connection is used, then the method 300 may proceed to block 313. Otherwise, the method 300 may proceed to block 314. At block 313, a switch to the WiFi interface (from the cellular interface) may be made. The cellular interface may remain enabled or may be de-activated after setting up the WiFi interface. At block 314, the WiFi interface may be used to deliver traffic, e.g., data traffic. The method 300 may then return to block 303.

Figure 4:
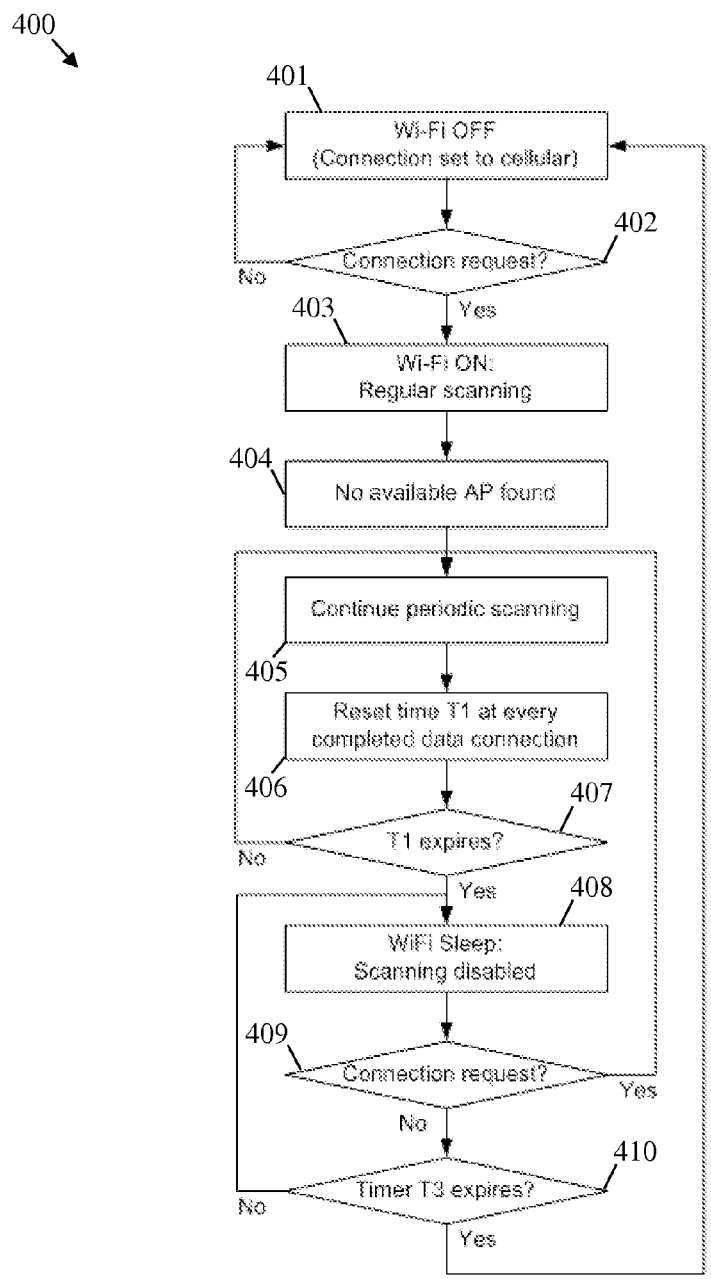
FIG. 4 is a schematic diagram of an embodiment of a data connection method under non-WiFi coverage.

FIG. 4 illustrates an embodiment of another data connection method 300 under non-WiFi coverage, e.g., under cellular coverage. The data connection method 400 may be implemented on a wireless communications device (e.g., the UE 120) when the device is within a cell coverage but outside any signal coverage range of a WiFi hotspot. The method 400 may be implemented by the device or a connection manager on the device. The method 400 may begin at block 401, where the WiFi interface may be OFF and the device may have an active cellular connection. At block 402, the method 400 may determine whether a connection request is made, e.g., from an application on the phone or from the network. If a connection request is detected, then the method 400 may proceed to block 403. Otherwise, the method 400 may return to block 401.

At block 403, the WiFi interface may be turned ON and the interface may start scanning available WiFi networks for data connection requests. At block 404, no available WiFI networks may be found because this device is assumed to be outside of any WiFi hotspots. At block 405, the WiFi interface may continue scanning available WiFi networks, e.g., in a periodic manner. At block 406, a timer (T1) may be reset at every completed data connection. At block 407, the method 400 may determine whether the timer is expired. If the timer is expired, then the method 400 may proceed to block 408. Otherwise, the method 400 may return to block 405.

At block 408, the WiFi interface may enter the Sleep mode and the scanning of WiFi networks may be disabled. At block 409, the method 400 may determine whether a connection request is made, e.g., from an application on the phone or from the network. If a connection request is detected, then the method 400 may return to block 405. Otherwise, the method 400 may proceed to block 410. At block 410, the method 400 may determine whether a timer (e.g., T3) expired. If the timer is expired, then the method 400 may return to block 401. Otherwise, the method 400 may return to block 408. During the steps at blocks 401 to 410, any connection request may be delivered via the cellular network.

The schemes and methods above are described in the context of a cellar interface and a WiFi interface as one possible scenario of implementation. However, the schemes and methods above may also be implemented, including similar steps and features as described above, using a plurality of different wireless access technologies and interfaces. For instance, the schemes and methods may be used to switch from a cellular interface or a relatively long range wireless access interface to a relatively short range wireless access interface, such as a Bluetooth interface, to deliver at least partially a data connection request via the cellular or long range wireless access interface until the short range wireless access interface setup is completed. In another scenario, the schemes and methods may be used to switch from a cellular interface to a Worldwide Interoperability for Microwave Access (WiMAX) interface, or from a WiMAX interface to a WiFi or Bluetooth interface.

Figure 5:
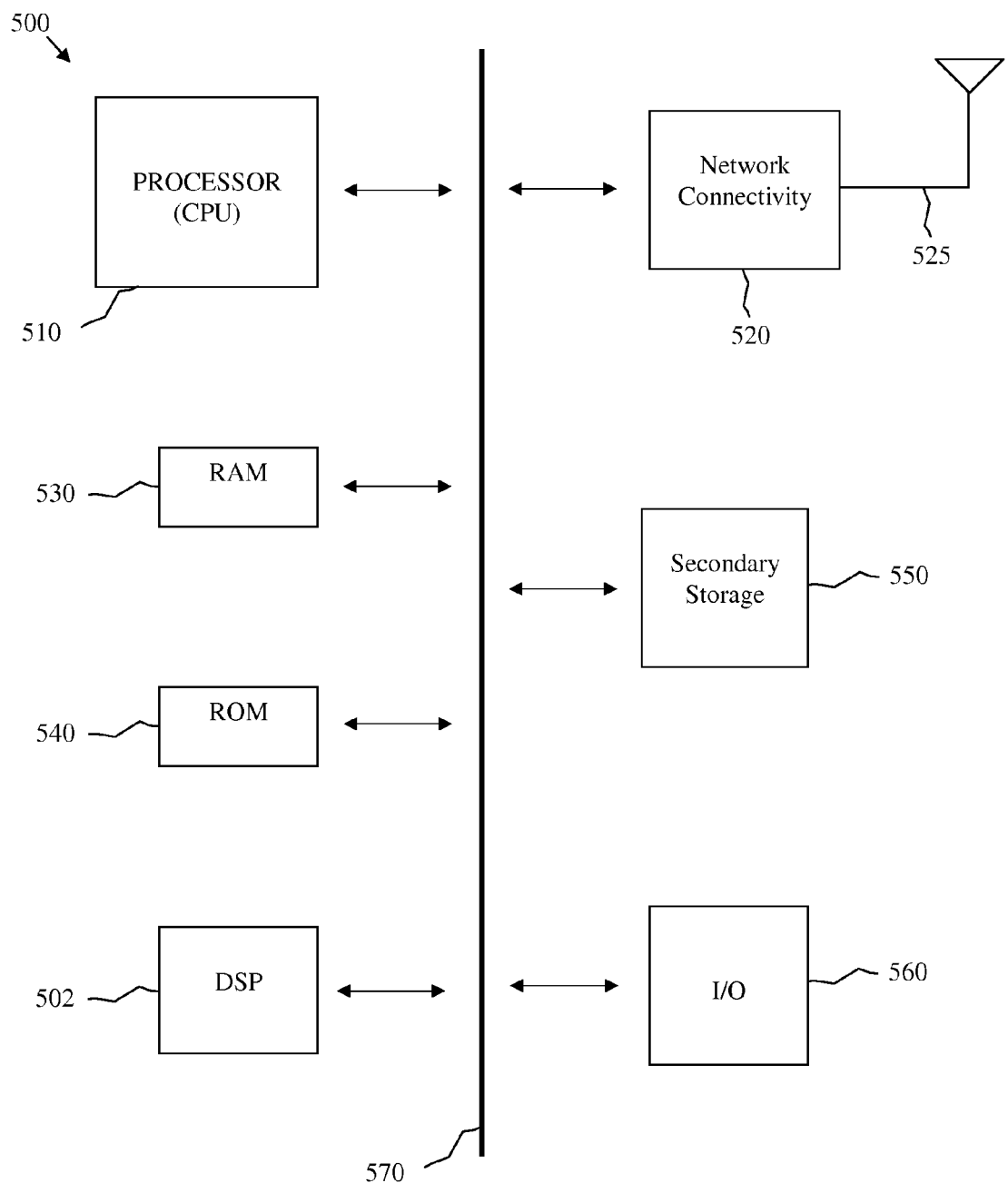
FIG. 5 is a schematic diagram of an embodiment of a wireless communication system.

The wireless devices (e.g., the UE 120) and other components described above may comprise a processing component that is capable of executing instructions that support the schemes and methods described above. FIG. 5 illustrates an example of a wireless communication system 500 that comprises a processing component 510 suitable for implementing one or more embodiments disclosed herein. In addition to the processor 510 (which may be referred to as a central processor unit or CPU), the wireless communication system 500 may comprise network connectivity devices 520, random access memory (RAM) 530, read only memory (ROM) 540, secondary storage 550, and input/output (I/O) devices 560. These components may communicate with one another via a bus 570. In some cases, some of these components may not be present or may be combined in various combinations with one another or with other components not shown. These components may be located in a single physical entity or in more than one physical entity. Any actions described herein as being implemented by the processor 510 may be implemented by the processor 510 alone or by the processor 510 in conjunction with one or more components shown or not shown in FIG. 5, such as a digital signal processor (DSP) 502. Although the DSP 502 is shown as a separate component, the DSP 502 may be incorporated into the processor 510.

The processor 510 may be configured to execute instructions, codes, computer programs, and/or scripts that may be accessed from the network connectivity devices 520, RAM 530, ROM 540, and/or secondary storage 550. While only one CPU 510 is shown, multiple processors may be present. Thus, while instructions may be discussed as being executed by a processor, the instructions may be executed simultaneously, serially, or otherwise by one or multiple processors. The processor 510 may be implemented as one or more CPU chips.

The network connectivity devices 520 may take the form of modems, modem banks, Ethernet devices, universal serial bus (USB) interface devices, serial interfaces, token ring devices, fiber distributed data interface (FDDI) devices, WLAN devices, radio transceiver devices such as code division multiple access (CDMA) devices, Global System for Mobile Communications (GSM) radio transceiver devices, worldwide interoperability for microwave access (WiMAX) devices, and/or other well-known devices for connecting to networks. These network connectivity devices 520 may enable the processor 510 to communicate with the Internet or one or more telecommunications networks or other networks from which the processor 510 may receive information or to which the processor 510 may send information to. The network connectivity devices 520 may also comprise one or more transceiver components 525 capable of transmitting and/or receiving data wirelessly.

The RAM 530 may be used to store volatile data and perhaps to store instructions that are executed by the processor 510. The ROM 540 may be a non-volatile memory device that typically has a smaller memory capacity than the memory capacity of the secondary storage 550. The ROM 540 may be used to store instructions and perhaps data that are read during execution of the instructions. Access to both RAM 530 and ROM 540 is typically faster than to secondary storage 550. The secondary storage 550 is typically comprised of one or more disk drives and/or other storage drives and may be used for non-volatile storage of data or as an over-flow data storage device if the RAM 530 is not large enough to hold all working data. The secondary storage 550 may be used to store programs that are loaded into the RAM 530 when such programs are selected for execution.

The I/O devices 560 may comprise liquid crystal displays (LCDs), touch screen displays, keyboards, keypads, switches, dials, mice, track balls, voice recognizers, card readers, paper tape readers, printers, video monitors, or other well-known input devices. Also, the transceiver 525 (e.g., comprising an antenna) may be considered to be a component of the I/O devices 560 instead of or in addition to being a component of the network connectivity devices 520.

One or various combinations of the components of the wireless communication system 500, including memory, hardware, firmware, software or others may be referred to herein as a "component". Furthermore when one or more components are referred to as configured to performing some (for example) function, task, or operation, this may include one component or multiple different components performing one, all, or some combination of the functions, tasks, or operations referred to.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A networking component comprising:
a first transceiver configured to communicate with a cellular network via a cellular interface;
a second transceiver configured to communicate with a Wireless Fidelity (WiFi) network via a WiFi interface; and
a connection manager configured to enable the WiFi interface when a data connection request is detected and disable the WiFi interface when no more data connection requests are detected, at least partially deliver the data connection request via the cellular interface while the WiFi interface is being set up, and switch data connection to the WiFi interface after completing WiFi interface setup,
wherein the connection manager switches the WiFi interface between a plurality of states including a first state in which the WiFi interface is disabled, a second state in which no WiFi network is associated with the WiFi interface and data transmission and reception utilize the cellular interface, a third state in which the cellular interface is active for data transmission and reception and ready to activate the WiFi interface when a WiFi network is detected, a fourth state in which the WiFi interface is in a sleep mode, a fifth state in which the WiFi network has been detected and data is transmitted and received via the cellular interface, a sixth state in which a WiFi network is associated with the WiFi interface and an end of connection to a cellular network has been determined, and a seventh state in which the WiFi interface is active for data transmission and reception, and
wherein at the third state a timer is reset, the WiFi interface scans for any available WiFi networks on the networking component, begins authentication and association when an available WiFi network is detected, transitions to the second state when a data connection request is detected, transitions to the sixth state when an association to an available WiFi network succeeds, and transitions to the fourth state when no available WiFi network is found and no connection request is detected until the timer expires, and wherein all data connection requests are delivered via the cellular interface at the third state.

2. A networking component comprising:
a first transceiver configured to communicate with a cellular network via a cellular interface;
a second transceiver configured to communicate with a Wireless Fidelity (WiFi) network via a WiFi interface; and
a connection manager configured to enable the WiFi interface when a data connection request is detected and disable the WiFi interface when no more data connection requests are detected, at least partially deliver the data connection request via the cellular interface while the WiFi interface is being set up, and switch data connection to the WiFi interface after completing WiFi interface setup,
wherein the connection manager switches the WiFi interface between a plurality of states including a first state in which the WiFi interface is disabled, a second state in which no WiFi network is associated with the WiFi interface and data transmission and reception utilize the cellular interface, a third state in which the cellular interface is active for data transmission and reception and ready to activate the WiFi interface when a WiFi network is detected, a fourth state in which the WiFi interface is in a sleep mode, a fifth state in which the WiFi network has been detected and data is transmitted and received via the cellular interface, a sixth state in which a WiFi network is associated with the WiFi interface and an end of connection to a cellular network has been determined, and a seventh state in which the WiFi interface is active for data transmission and reception, and
wherein at the fourth state a timer is reset, the WiFi interface does not scan for any available WiFi network on the networking component, enters a sleep mode, exits the sleep mode and transitions to the third state when a data connection request is detected, and transitions to the first state when no connection request is detected until the timer expires, and wherein all data connection requests are delivered via the cellular interface at the fourth state.

3. An apparatus comprising:
a connection manager in a user equipment (UE) configured to communicate with a cellular network via a cellular interface and with a short range wireless access network via a short range wireless access interface,
wherein the connection manager is configured to detect whether a data connection request is received from an application on the UE or from a network, switch the short range wireless access interface from disabled to enabled when the data connection request is detected, and switch the short range wireless access interface from enabled to disabled when no more data connection requests are detected after expiration of a pre-determined time,
wherein the data connection request is at least partially delivered via the cellular interface while the short range wireless access interface is being set up and the data connection is switched to the short range wireless access interface after completing the short range wireless access interface setup, and
wherein the short range wireless access interface comprises a Wireless Fidelity (WiFi) interface, wherein the connection manager switches the WiFi interface between a plurality of states including a first state in which the WiFi interface is disabled, a second state in which no WiFi network is associated with the WiFi interface and data transmission and reception utilize the cellular interface, a third state in which the cellular interface is active for data transmission and reception and ready to activate the WiFi interface when a WiFi network is detected, a fourth state in which the WiFi interface is in a sleep mode, a fifth state in which the WiFi network has been detected and data is transmitted and received via the cellular interface, a sixth state in which a WiFi network is associated with the WiFi interface and an end of connection to a cellular network has been determined, and a seventh state in which the WiFi interface is active for data transmission and reception, wherein at the third state a timer is reset, the WiFi interface scans for any available WiFi networks on the networking component, begins authentication and association when an available WiFi network is detected, transitions to the second state when a data connection request is detected, transitions to the sixth state when an association to an available WiFi network succeeds, and transitions to the fourth state when no available WiFi network is found and no connection request is detected until the timer expires, and wherein all data connection requests are delivered via the cellular interface at the third state.

4. An apparatus comprising:
a connection manager in a user equipment (UE) configured to communicate with a cellular network via a cellular interface and with a short range wireless access network via a short range wireless access interface,
wherein the connection manager is configured to detect whether a data connection request is received from an application on the UE or from a network, switch the short range wireless access interface from disabled to enabled when the data connection request is detected, and switch the short range wireless access interface from enabled to disabled when no more data connection requests are detected after expiration of a pre-determined time,
wherein the data connection request is at least partially delivered via the cellular interface while the short range wireless access interface is being set up and the data connection is switched to the short range wireless access interface after completing the short range wireless access interface setup, and
wherein the short range wireless access interface comprises a Wireless Fidelity (WiFi) interface, wherein the connection manager switches the WiFi interface between a plurality of states including a first state in which the WiFi interface is disabled, a second state in which no WiFi network is associated with the WiFi interface and data transmission and reception utilize the cellular interface, a third state in which the cellular interface is active for data transmission and reception and ready to activate the WiFi interface when a WiFi network is detected, a fourth state in which the WiFi interface is in a sleep mode, a fifth state in which the WiFi network has been detected and data is transmitted and received via the cellular interface, a sixth state in which a WiFi network is associated with the WiFi interface and an end of connection to a cellular network has been determined, and a seventh state in which the WiFi interface is active for data transmission and reception, wherein at the fourth state a timer is reset, the WiFi interface does not scan for any available WiFi network on the networking component, enters a sleep mode, exits the sleep mode and transitions to the third state when a data connection request is detected, and transitions to the first state when no connection request is detected until the timer expires, and wherein all data connection requests are delivered via the cellular interface at the fourth state.

5. A wireless communications system implemented method comprising:
detecting whether a data connection request is received from an application on a User Equipment (UE) or from a network;
switching, with a processor, a first wireless access interface from disabled to enabled when the data connection request is detected;
associating, with the processor, the first wireless access interface with the data connection request;
switching, with the processor, the first wireless access interface from enabled to disabled when no data connection requests are detected within a pre-determined time period;
at least partially delivering the data connection request via an active second wireless access interface while the first wireless access interface is being set up; and
switching the data connection to the first wireless access interface after completing the first wireless access interface setup,
wherein the first wireless active interface comprises a Wireless Fidelity (WiFi) interface, wherein the second interface comprises a cellular interface, wherein the wireless communications system comprises a connection manager, wherein the connection manager switches the WiFi interface between a plurality of states including a first state in which the WiFi interface is disabled, a second state in which no WiFi network is associated with the WiFi interface and data transmission and reception utilize the cellular interface, a third state in which the cellular interface is active for data transmission and reception and ready to activate the WiFi interface when a WiFi network is detected, a fourth state in which the WiFi interface is in a sleep mode, a fifth state in which the WiFi network has been detected and data is transmitted and received via the cellular interface, a sixth state in which a WiFi network is associated with the WiFi interface and an end of connection to a cellular network has been determined, and a seventh state in which the WiFi interface is active for data transmission and reception, wherein at the third state a timer is reset, the WiFi interface scans for any available WiFi networks on the networking component, begins authentication and association when an available WiFi network is detected, transitions to the second state when a data connection request is detected, transitions to the sixth state when an association to an available WiFi network succeeds, and transitions to the fourth state when no available WiFi network is found and no connection request is detected until the timer expires, and wherein all data connection requests are delivered via the cellular interface at the third state.

6. A wireless communications system implemented method comprising:
detecting whether a data connection request is received from an application on a User Equipment (UE) or from a network;
switching, with a processor, a first wireless access interface from disabled to enabled when the data connection request is detected;
associating, with the processor, the first wireless access interface with the data connection request;

switching, with the processor, the first wireless access interface from enabled to disabled when no data connection requests are detected within a pre-determined time period;

at least partially delivering the data connection request via an active second wireless access interface while the first wireless access interface is being set up; and switching the data connection to the first wireless access interface after completing the first wireless access interface setup, wherein the first wireless active interface comprises a Wireless Fidelity (WiFi) interface, wherein the second interface comprises a cellular interface, wherein the wireless communications system comprises a connection manager, wherein the connection manager switches the WiFi interface between a plurality of states including a first state in which the WiFi interface is disabled, a second state in which no WiFi network is associated with the WiFi interface and data transmission and reception utilize the cellular interface, a third state in which the cellular interface is active for data transmission and reception and ready to activate the WiFi interface when a WiFi network is detected, a fourth state in which the WiFi interface is in a sleep mode, a fifth state in which the WiFi network has been detected and data is transmitted and received via the cellular interface, a sixth state in which a WiFi network is associated with the WiFi interface and an end of connection to a cellular network has been determined, and a seventh state in which the WiFi interface is active for data transmission and reception, wherein at the fourth state a timer is reset, the WiFi interface does not scan for any available WiFi network on the networking component, enters a sleep mode, exits the sleep mode and transitions to the third state when a data connection request is detected, and transitions to the first state when no connection request is detected until the timer expires, and wherein all data connection requests are delivered via the cellular interface at the fourth state.

* * * * *